Figure 7:
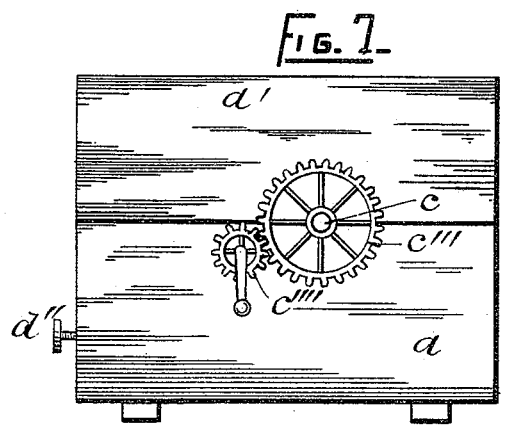

(No Model.) 2 Sheets—Sheet 1.
E. L. DRAKE.
ICE CREAM FREEZER.
No. 438,103. Patented Oct. 7, 1890.
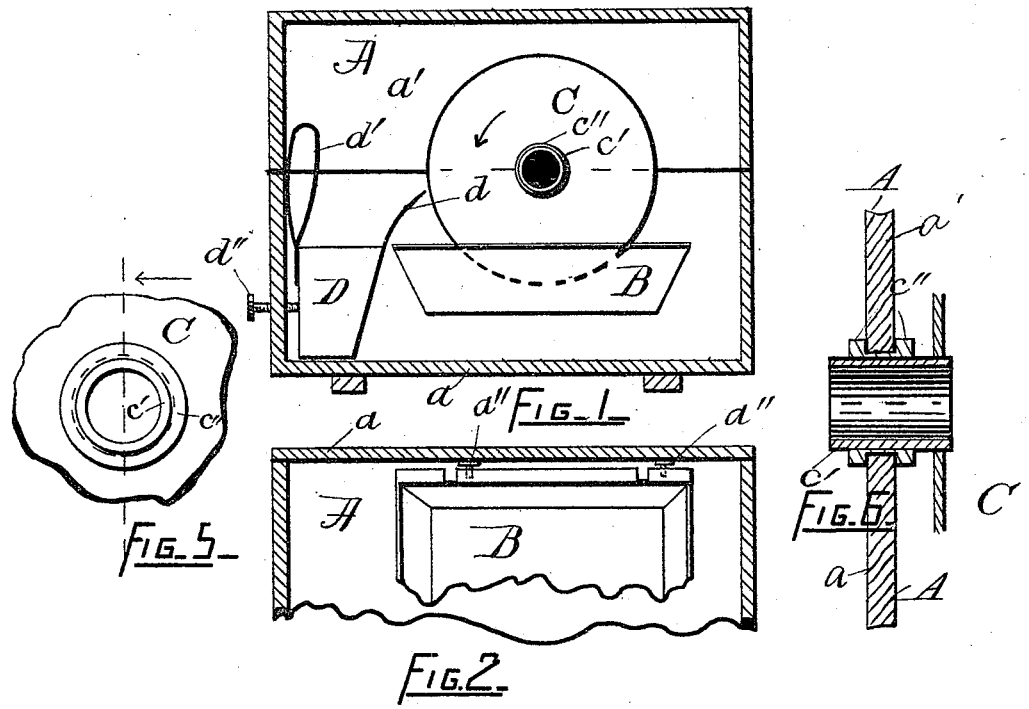
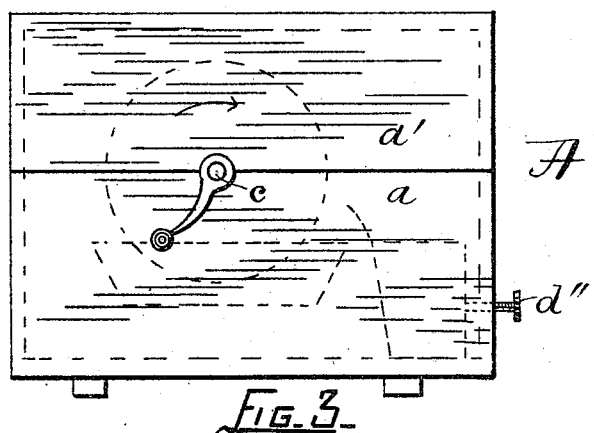
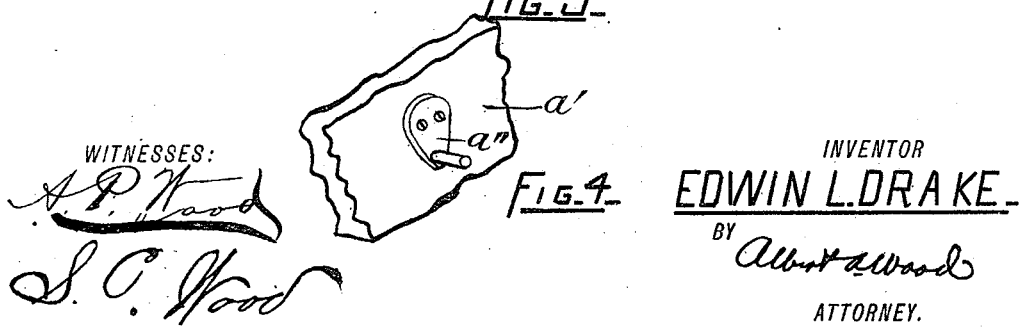
WITNESSES:
A. P. Wood
S. C. Wood
INVENTOR
EDWIN L. DRAKE
BY Albert A. Wood
ATTORNEY.

(No Model.) 2 Sheets—Sheet 2.

E. L. DRAKE.
ICE CREAM FREEZER.

No. 438,103. Patented Oct. 7, 1890.

WITNESSES:
Luke F. Hayden

INVENTOR
EDWIN L. DRAKE
BY
ATTORNEY.

UNITED STATES PATENT OFFICE.

EDWIN L. DRAKE, OF WINCHESTER, TENNESSEE.

ICE-CREAM FREEZER.

SPECIFICATION forming part of Letters Patent No. 438,103, dated October 7, 1890.

Application filed November 12, 1889. Serial No. 330,010. (No model.)

*To all whom it may concern:*

Be it known that I, EDWIN L. DRAKE, a citizen of the United States, and a resident of Winchester, in the county of Franklin and State of Tennessee, have invented certain new and useful Improvements in Ice-Cream Freezers; and I do hereby declare the following to be a full, clear, and exact description of the invention, such as will enable others skilled in the art to which it appertains to make and use the same, reference being had to the accompanying drawings, and to letters of reference marked thereon, which form part of this specification.

This invention relates to devices for freezing cream with the usual refrigerant, the object being to economize ice in the operation and to cause the cream to be firmly frozen in a cake to the fullest extent of capacity of the refrigerant and to remove it for the purpose of serving at any desired time after the freezing process begins or of storing the cream in a frozen state, if desired, the details of construction necessary to which end are hereinafter fully described, and the parts claimed as new pointed out in the claims.

In the accompanying drawings, Figure 1 is an interior view of the device from the side opposite the crank, showing the parts in their proper relative positions when freezing, the side of the casing being removed for the purpose of showing such parts. Fig. 2 is a sectional plan view showing a portion of the cream-containing pan and exhibiting the manner of hanging it in the position shown in Fig. 1. Fig. 3 is a side elevation of the device from the side opposite that shown in Fig. 1, showing the hand-crank and showing by dotted lines the relative positions of the parts. Fig. 4 is a sectional perspective view of a portion of the casing, showing the small casting employed in sustaining the pan in its operative position. Fig. 5 is a sectional side elevation of a portion of the refrigerating-cylinder, showing the hollow journal and its flanges. Fig. 6 is a section on line $x$ $x$, Fig. 5, further exhibiting the parts therein shown. Fig. 7 is a side elevation of the device, showing a form of gearing for driving the cylinder.

In the figures, like reference-marks indicating corresponding parts in the several views, A is the casing, which is composed of two parts—a bottom $a$ and top $a'$—which may be secured in place when closed in any approved manner, and may, if desired, be hinged together, admitting of the raising of the top $a'$ to afford an entrance to the interior for various purposes. This casing is made of any suitable non-conducting material, the cleats on its bottom performing the double function of preventing warping and of legs on which to set the machine. In the preferable construction the lower part of this casing A is provided on two of its interior sides with projecting pins, while the pan B is provided with outwardly-projecting flanges, which rest on said pins and support the pan at such a distance below the cylinder that the milk or other fluid contained therein can all be accumulated on the cylinder, having the effect to enlarge its diameter, thus reaching to the bottom of the pan. The flanges on the pan are also provided with gaps in their continuity, so placed that when these notches are brought in conjunction with the pins in the sides of the casing the pan with its contents will drop clear of contact with the cylinder, thus enabling the operator at any time in the process of freezing to obtain frozen cream from the cylinder unmixed with that yet fluid in the pan. The freezing can be resumed by replacing the pan on its supports, which again brings the contents in contact with the refrigerating-surface of the cylinder.

The cylinder C runs in any suitable notches or boxes in the top edges of the part $a$ of the casing and is so set as to run to the desired depth in the pan B. This cylinder is adapted to hold the refrigerant compound, and has on one end a journal $c$, while the other end is provided with a hollow neck for the passage of the refrigerant to the interior, which neck $c'$ also performs the functions of a bearing for that end of the cylinder. The hollow neck $c'$ is provided with annular flanges $c''$, which form the bearing in the box and prevent outward or inward movement. This hollow neck may be stopped in any approved manner. This cylinder may be provided with longitudinal agitating-slats on its inner circumference, if desired; but this is not a point of novelty in its construction.

If desired, the journal $c$ is provided with a spur-gear $c'''$, while attached to the casing in an approved manner is the pinion $c''''$, engaging therewith and being provided with a crank of the desired length. If desired, a motor of any suitable form may be attached to the cylinder by belt or otherwise, or a band-pulley may be applied for a large manufacturing-machine.

In the side of the casing toward which the cylinder C runs is a pan or receiver D, which is for the purpose of receiving and storing under refrigeration the cream when it is removed from the cylinder by means of the knife-edge $d$, which is secured to or made integrally with the said pan D, and is so formed and arranged as to scrape the surface of the cylinder C when held against the said cylinder as it is revolved by means of the handle $d'$ or screw $d''$, which are supplied for that purpose. As soon as filled or the desired amount is obtained within this pan D it may be removed and the cream placed therefrom in dishes for serving, any residue being left in the pan, which is then returned to the refrigerating-chamber, where it is preserved frozen until needed. This pan D may be hung on trunnions after the manner of the pan B on the cleats $a''$, if desired; but the construction shown, and at the present time the preferred one is as shown in Fig. 1, where it is placed on the bottom of the casing A.

The operation of this device is as follows: The refrigerating compound or mixture is placed in the cylinder C and the cream to be frozen in the pan B, after which the cylinder is revolved in the milk, which it takes up, and which freezes on its surface, the accretion continuing to the desired depth, after which the knife-edge $d$ of the pan D is pressed against the periphery of the cream-covered cylinder, the pan B lowered from its place, so that no unfrozen cream can be taken up, and as much cream as desired removed from the cylinder, or the guide E used, as set forth. Very beautiful effects may be obtained by freezing different colors of cream or ices in succession, either flat or corrugated layers being possible.

Having thus described my invention, what I claim as new, and desire to secure by Letters Patent of the United States, is—

1. In an ice-cream-freezer, the casing A, provided with the pins $a''$ projecting from its interior sides, the pan B, having notched flanges supported by said pins, and the cylinder C, provided with journals $c\ c'$ in the sides of the casing, the journal $c'$ being hollow and provided with the annular flanges $c''$, forming the bearing for said journal $c'$ in the casing, as specified.

2. In an ice-cream-freezer, the casing provided with the pins $a''$, projecting from its interior, the pan B, having notched flanges supported by said pins, the cylinder C, provided with journals $c\ c'$ in the sides of the casing, the journal $c'$ being hollow and provided with the annular flanges $c''$, and the receiver D, provided with a knife-edge $d$, the handle $d'$, and the screw $d''$, for adjusting said receiver in relation to the cylinder, substantially as and for the purpose specified.

In testimony whereof I hereunto affix my signature in presence of two witnesses.

EDWIN L. DRAKE.

Witnesses:
ALBERT A. WOOD,
C. E. LUCAS.